(12) United States Patent
Imai

(10) Patent No.: US 9,876,926 B2
(45) Date of Patent: Jan. 23, 2018

(54) SERVER THAT SYNCHRONIZES INFORMATION BETWEEN INFORMATION PROCESSORS, INFORMATION PROCESSING SYSTEM, INFORMATION PROCESSING APPARATUS, CONTROL METHOD FOR SERVER, CONTROL METHOD FOR INFORMATION PROCESSING SYSTEM, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Yasuhiro Imai, Noda (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/244,123

(22) Filed: Aug. 23, 2016

(65) Prior Publication Data

US 2017/0064119 A1    Mar. 2, 2017

(30) Foreign Application Priority Data

Aug. 25, 2015    (JP) ................................. 2015-165852

(51) Int. Cl.
*G06F 3/12* (2006.01)
*H04N 1/00* (2006.01)
*H04N 1/36* (2006.01)

(52) U.S. Cl.
CPC ..... *H04N 1/00933* (2013.01); *H04N 1/00344* (2013.01); *H04N 1/00347* (2013.01);
(Continued)

(58) Field of Classification Search
CPC ........... H04N 1/00344; H04N 1/00347; H04N 1/00933; H04N 1/36; H04N 2201/3215; H04N 2201/0039; H04N 2201/0094
(Continued)

(56) References Cited

U.S. PATENT DOCUMENTS

2009/0237728 A1* 9/2009 Yamamoto ............ G06F 3/1454
358/1.15

FOREIGN PATENT DOCUMENTS

JP        2003108539 A        4/2003

OTHER PUBLICATIONS

Kaju, Ryuichi; JP 2003-108539; Time Synchronizing Method Between Server and Client; Apr. 11, 2003.*

* cited by examiner

*Primary Examiner* — Neil R McLean
(74) *Attorney, Agent, or Firm* — Rossi, Kimms & McDowell LLP

(57) ABSTRACT

A server 100 capable of surely synchronizing MFPs 102 and 103. The server 100 writes a first time that the server 101 measures in response to storing of information changed in the MFP 102. When the time that the server 101 measures is changed, a time difference between the time before the change and the time after the change is calculated. A modified first time is acquired by applying the calculated time difference to the written first time when the time that the server 101 measures is changed after the first time has been written. When the modified first time is a time between a time when a previous inquiry was received from the MFP 103 and a time when a current inquiry from the MFP 103 is received, the information indicating the content of the changed information is transmitted to the MFP 103.

11 Claims, 13 Drawing Sheets

(52) U.S. Cl.
  CPC ....... *H04N 1/36* (2013.01); *H04N 2201/0039* (2013.01); *H04N 2201/0094* (2013.01); *H04N 2201/3215* (2013.01)

(58) Field of Classification Search
  USPC ........................................................ 358/1.15
  See application file for complete search history.

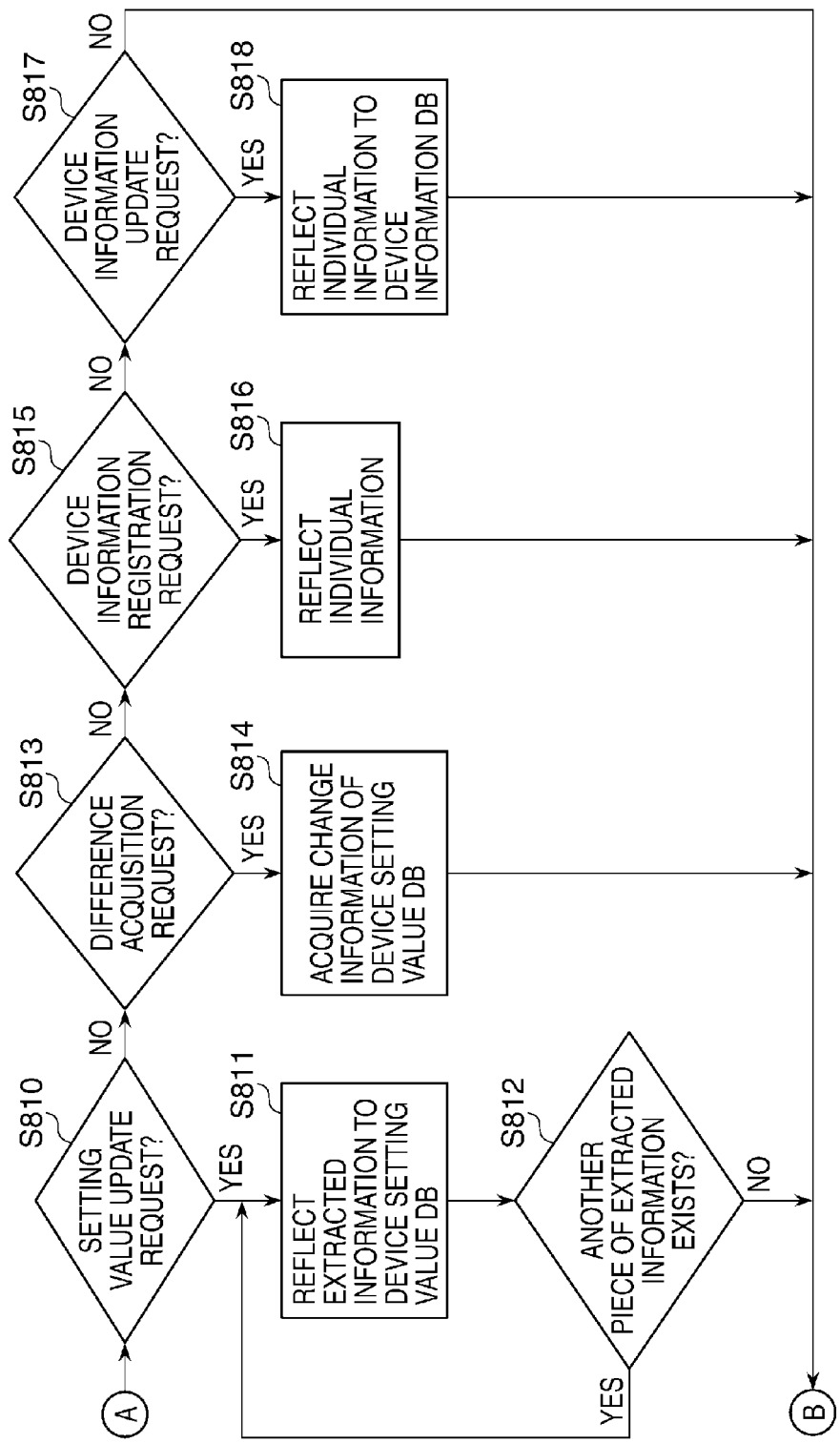

SERVER THAT SYNCHRONIZES INFORMATION BETWEEN INFORMATION PROCESSORS, INFORMATION PROCESSING SYSTEM, INFORMATION PROCESSING APPARATUS, CONTROL METHOD FOR SERVER, CONTROL METHOD FOR INFORMATION PROCESSING SYSTEM, CONTROL METHOD FOR INFORMATION PROCESSING APPARATUS, AND STORAGE MEDIUM

BACKGROUND OF THE INVENTION

Field of the Invention

The present invention relates to a server, an information processing system, an information processing apparatus, a control method for a server, a control method for an information processing system, a control method for an information processing apparatus, and a storage medium.

Description of the Related Art

Conventionally, there is a known information processing system in which a server and a plurality of information processing apparatuses are connected to one another via a network and time of the server and that of plurality of information processing apparatuses are synchronized to the time that the server measures (for example, see Japanese Patent Laid-Open No. 2003-108539).

Generally, the server manages setting information (hereinafter, referred to as "master data") that is applied to all the information processing apparatuses included in the information processing system, and each information processing apparatus manages at least a part of the master data (hereinafter, referred to as "device-use master data"). Here, when the setting information applied to one of the information processing apparatuses is changed, the information processing apparatus transmits the changed setting information (hereinafter, referred to as "change information") to the server. The server reflects the change information to the master data and writes a time T, which the server measures when the change information is reflected to the master data, (hereinafter, referred to as a "reflection time T") in the master data. On the other hand, another of the information processing apparatuses periodically inquires to the server whether or not the change information has been reflected to the master data, and reflects the change information to the device-use master data of the other of the information processing apparatuses in a case that the change information has been reflected to the master data. Specifically, when the reflection time T written in the master data is the time between the time when the current inquiry has been sent and the time when a previous inquiry has been sent, the server transmits change information corresponding to the reflection time T to the other of the information processing apparatuses. The other of the information processing apparatuses, to which the change information has been sent, reflects the change information to the device-use master data. As a result, the change information is shared between the respective information processing apparatuses that compose the information processing system and, thus, the device-use master data in each of the respective information processing apparatuses is synchronized.

However, there may be a case that a user changes the time measured by the server. Specifically, in a case that the user changes the time measured by the server after the previous inquiry is sent from the other of the information processing apparatuses, the reflection time T may be changed to time prior to the time when the previous inquiry is sent. In this case, even when an inquiry is newly sent from another of the information processing apparatuses, the change information corresponding to the reflection time T is not transmitted to the other of the information processing apparatuses since the reflection time T does not exists between the time when the previous inquiry is sent and the time when the current inquiry is sent. As a result, the change information is not reflected to the device-use master data, and thus the device-use master data in each of the respective information processing apparatuses is not synchronized.

In other words, there has been a problem that, when the time measured by the server is changed, there is possibility that the change information is not transmitted to another information processing apparatus and thus device-use master data of each of the respective information processing apparatuses cannot be surely synchronized.

SUMMARY OF THE INVENTION

The present invention provides a server, an information processing system, an information processing apparatus, a control method for a server, a control method for an information processing system, a control method for an information processing apparatus, and a storage medium, each of which surely synchronizes a plurality of information.

Accordingly, the present invention provides a server that communicates with a plurality of information processing apparatuses and measures time, the server including at least one processor and at least one memory coupled to the at least one processor which act as a storage control unit configured to store, in a storage unit, information changed in one of the information processing apparatuses, a first writing unit configured to write a first time that the server measures in response to the storing of the changed information, a reception unit configured to receive, from another of the information processing apparatuses, an inquiry on whether or not the storage control unit has stored the changed information, a transmission unit configured to transmit information indicating a content of the changed information to the other of the information processing apparatuses when the written first time is the time between a second time when the reception unit received a previous inquiry and a third time when the reception unit received the current inquiry, a second writing unit configured to calculate and write, when the time that the server measures is changed, a time difference between the time before the change and the time after the change, and an acquisition unit configured to acquire a modified first time by applying the written time difference to the written first time when the time that the server measures is changed after the first time has been written, wherein, when the modified first time is a time between the time when the previous inquiry was received and the time when the current inquiry is received, the transmission unit transmits the information indicating the content of the changed information to the other of the information processing apparatuses.

According to the present invention, the plurality of information processing apparatuses can be surely synchronized.

Further features of the present invention will become apparent from the following description of exemplary embodiments (with reference to the attached drawings).

BRIEF DESCRIPTION OF THE DRAWINGS

FIGS. 8A and 8B are flowcharts showing procedures in a request reception process executed when the server appearing in FIG. 1 receives a change-information-attached request.

DESCRIPTION OF THE EMBODIMENTS

Hereinafter, a first embodiment of the present invention will be described in detail with reference to the drawings.

Figure 1:
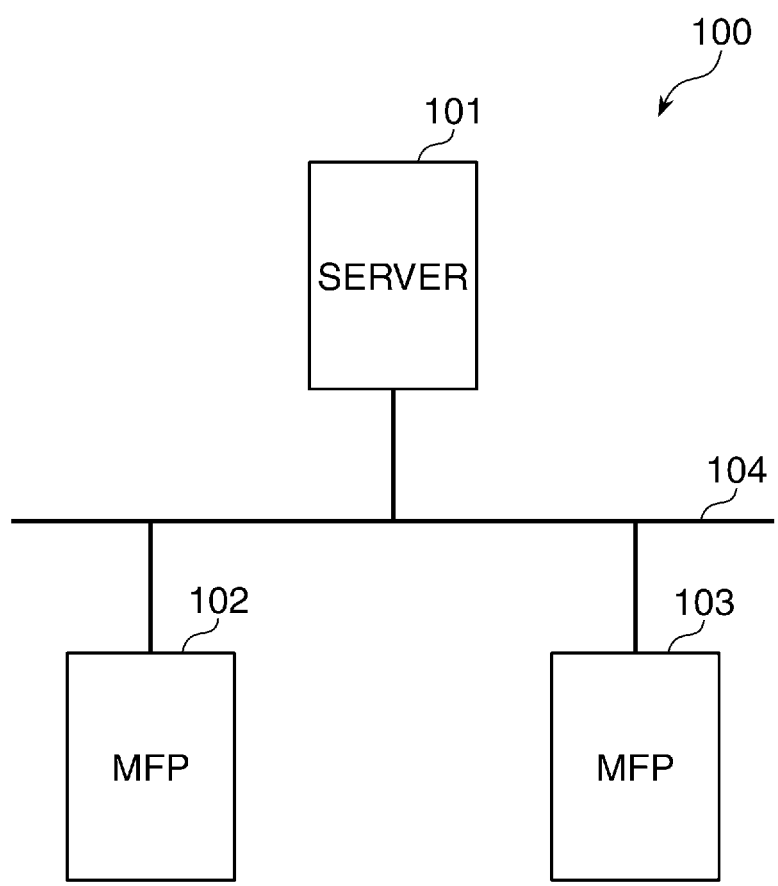
FIG. 1 is a conceptual diagram schematically showing a structure of an information processing system according to a first embodiment of the present invention.

FIG. 1 is a conceptual diagram schematically showing a structure of an information processing system 100 according to the first embodiment of the present invention.

The information processing system 100 of FIG. 1 includes a server 101 and MFPs 102 and 103 serving as information processing apparatuses, and the server 101 and MFPs 102 and 103 are connected to one another via a network 104.

The server 101 manages a later described master data 400 in which information to be applied to the MFPs 102 and 103 is recorded. The server 101 also transmits change information to the MFPs 102 and 103 when the change information is recorded in the master data 400. Further, when the change information is received from one of the MFPs 102 and 103, the server 101 reflects the change information to the master data 400 and transmits the change information to the other of the MFPs 102 and 103. The MFPs 102 and 103 execute, for example, a copy process and a fax process and store various setting information used to execute the copy process and fax process.

Figure 2:
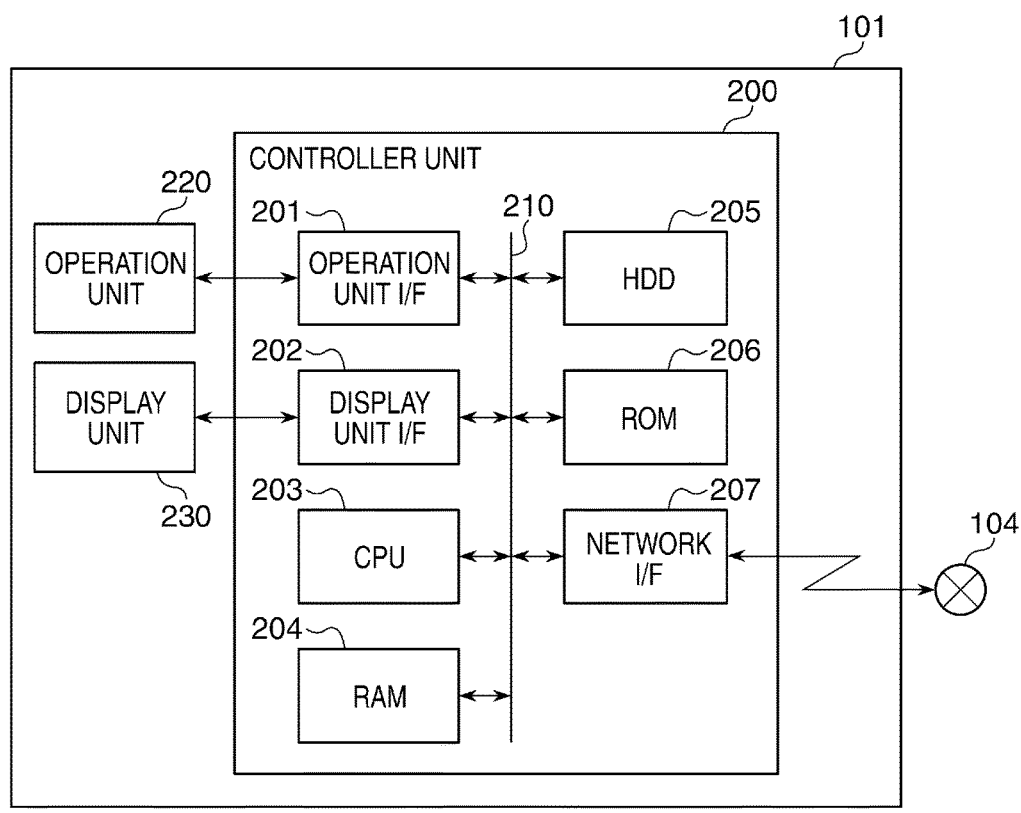
FIG. 2 is a block diagram schematically showing an internal structure of a server appearing in FIG. 1.

FIG. 2 is a block diagram schematically showing an internal structure of the server 101 appearing in FIG. 1.

The server 101 of FIG. 2 includes a controller unit 200, an operation unit 220, and a display unit 230. The controller unit 200 includes an operation unit I/F 201, a display unit I/F 202, a CPU 203, a RAM 204, an HDD 205, a ROM 206, and a network I/F 207. The components of the controller unit 200 are connected to one another via a system bus 210. Further, the operation unit 220 is connected to the operation unit I/F 201, the display unit 230 is connected to the display unit I/F 202, and the network 104 is connected to the network I/F 207.

The CPU 203 starts an operating system by executing a boot program stored in the ROM 206. Further, the CPU 203 executes respective application programs, which are stored in the HDD 205, on the started operating system. The RAM 204 is a working memory of the CPU 203. The HDD 205 stores the above described application programs and later described master data 400. The operation unit 220 accepts instructions from a user. The display unit 230 displays, for example, status information which indicates an operation condition of the server 101.

Figure 3:
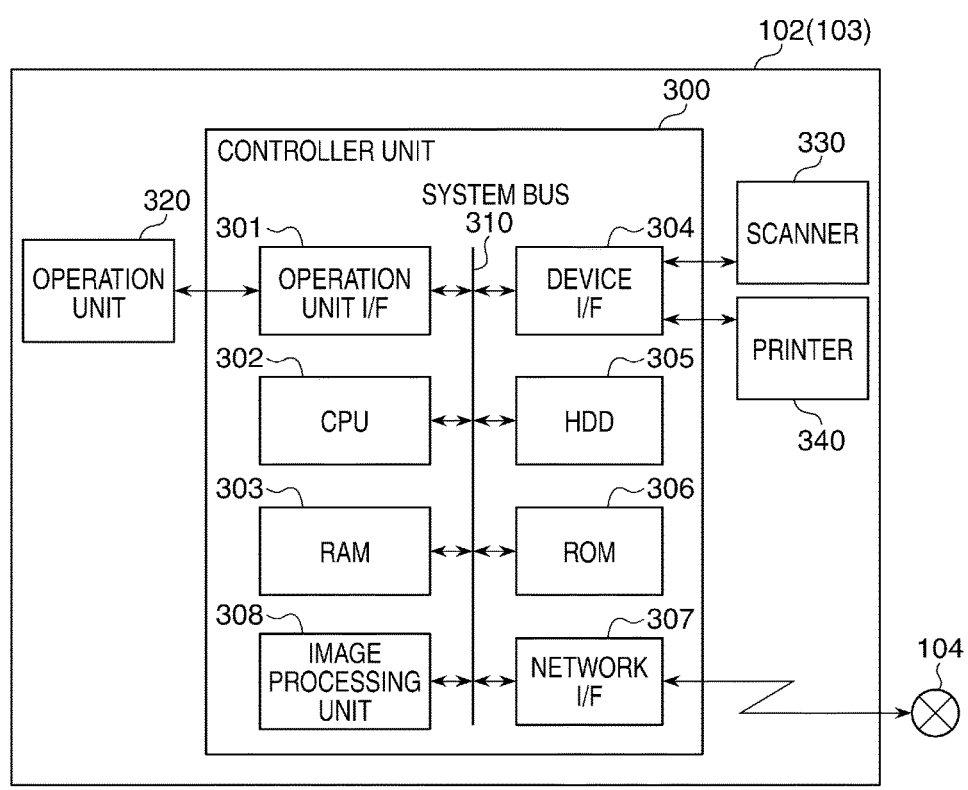
FIG. 3 is a block diagram schematically showing an internal structure of an MFP appearing in FIG. 1.

FIG. 3 is a block diagram schematically showing an internal structure of the MFP 102 or 103 appearing in FIG. 1.

The MFP 102 or 103 of FIG. 3 includes a controller unit 300, an operation unit 320, a scanner 330, and a printer 340. The controller unit 300 includes an operation unit I/F 301, a CPU 302, a RAM 303, a device I/F 304, an HDD 305, a ROM 306, a network I/F 307, and an image processing unit 308. The components of the controller unit 300 are connected to one another via a system bus 310. Further, the operation unit 320 is connected to the operation unit I/F 301, the scanner 330 and printer 340 are connected to the device I/F 304, and the network 104 is connected to the network I/F 307.

The CPU 302 starts an operating system by executing a boot program stored in the ROM 306. Further, the CPU 302 executes respective application programs, which are stored in the HDD 305, on the started operating system. The RAM 303 is a working memory of the CPU 302. Further, the RAM 303 temporarily stores image data. The HDD 305 stores device-use master data 341 in which information to be applied to the above described application programs, image data, and MFPs 102 and 103 is written (See Table 1 below).

TABLE 1

| Key identifier | Text displayed on UI | Initial value | Value range | Applicable models/ firmware version | Display requirement | Management type |
|---|---|---|---|---|---|---|
| settings.pattern | Design print | 0 | 0-1 | Model A/all Model B/all Model C/V3.01 or newer | Design license | Edit/ reference |
| settings.density | Printing density | 5 | 0-10 | Model A/all Model B/2.01 or newer | — | Edit/ reference |
| settings.density | Printing density | 3 | 0-6 | Model B/1.99 or former Model C/all | — | Edit/ reference |

TABLE 1-continued

| Key identifier | Text displayed on UI | Initial value | Value range | Applicable models/firmware version | Display requirement | Management type |
|---|---|---|---|---|---|---|
| settings.device_sirial | Serial ID | "" | Text | All | — | Reference only |
| settings.copy_cur_page | None (page number of page being copied) | 0 | 0-99999 | All | — | Reference only |
| settings.sleep_time | Sleep time | 0 | 0-14400 | All | | Edit/reference |
| settings.dns_address | DNS server address | "" | Text | All | — | Edit/reference |
| ... | | | | | | |

In Table 1, the device-use master data 341 includes items of a key identifier, a text displayed on UI, an initial value, a value range, an applicable models/firmware version, a display requirement, and a management type for information respectively applied to the MFPs 102 and 103. The key identifier records an identifier used to specify information which is applied to the MFPs 102 and 103. The text displayed on UI records a text, corresponding to the information applied to the MFPs 102 and 103, to be displayed on a liquid crystal display of the later described operation unit 320. The initial value records an initial value of the information applied to the MFPs 102 and 103, and the value range records a changeable range of the information applied to the MFPs 102 and 103. The applicable models/firmware version records a model of the MFPs 102 and 103 to which each piece of information is applied and firmware version information of the MFPs 102 and 103. Regarding each piece of information, applicable models or firmware versions are different, and, in the device-use master data 341, applicable models and firmware versions are written for each piece of information. For example, it is written to the applicable models/firmware version of the device-use master data 341 that the models to which a design print function is applicable are Models A and B, and Model C that has a firmware version 3.01 or newer. Further, it is written that the models in which the printing density is adjustable in eleven levels have a value range from 0 to 10 and are Model A and Model B that has a firmware version 2.01 or newer. Further, it is written that the models in which the printing density is adjustable in seven levels have a value range from 0 to 6 and are Model C and Model B that has a firmware version 1.99 or former. The management type records "edit/reference" or "reference only", and the information written as "edit/reference" is editable while the information written as "reference only" is not editable.

The operation unit 320 includes a touch panel type liquid crystal display and receives manual-operation performed on a soft-key displayed on the liquid crystal display. The scanner 330 reads an original document and generates image data, and the printer 340 prints the image data generated by the scanner 330 on a sheet of recording paper for example. The image processing unit 308 performs, on the image data generated by the scanner 330 or image data to be printed by the printer 340, a rotation process to rotate the image data, a compression process to compress the volume of the image data, or a resolution conversion process to convert a resolution of the image data, for example.

Figure 4:
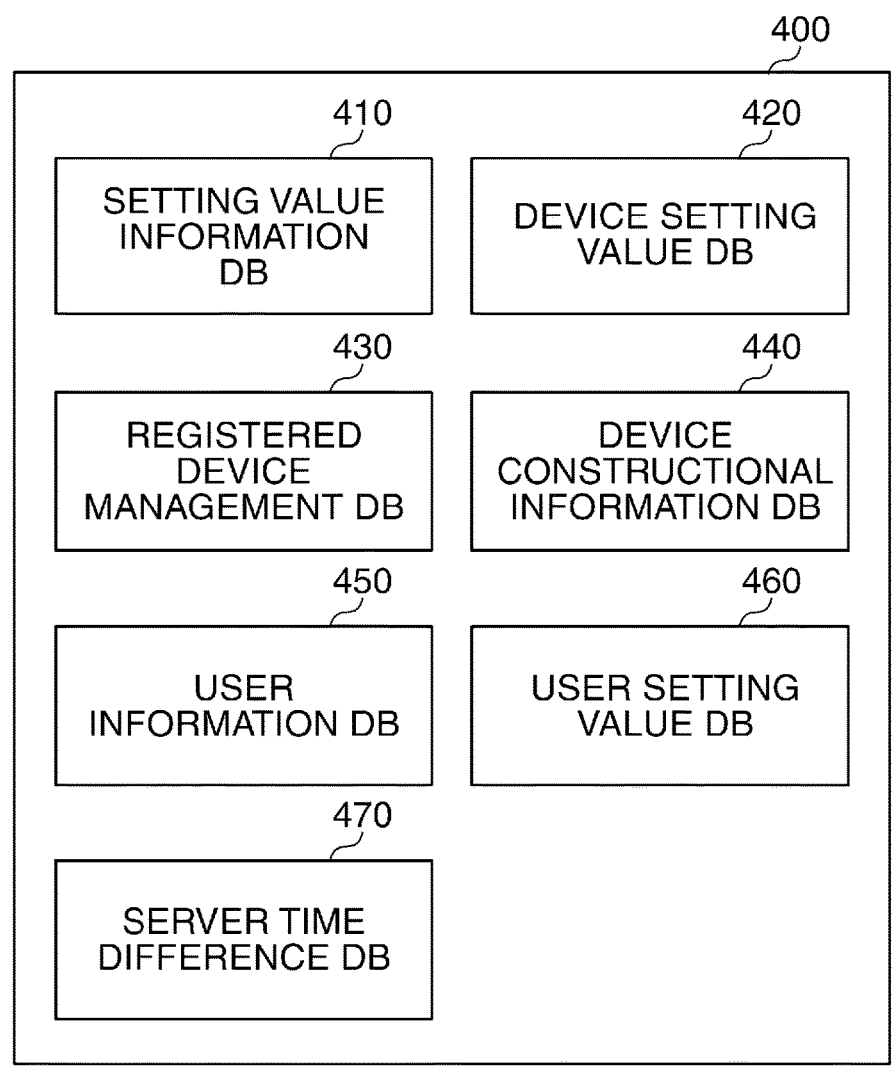
FIG. 4 is a diagram used to explain master data stored in an HDD appearing in FIG. 2.

FIG. 4 is a diagram used to explain the master data 400 stored in the HDD 205 appearing in FIG. 2.

The master data 400 of FIG. 4 includes a setting value information DB 410, a device setting value DB 420, a registered device management DB 430, a device constructional information DB 440, a user information DB 450, a user setting value DB 460, and a server time difference DB 470.

The setting value information DB 410 is, for example, metadata managed by the server 101 (See Table 2 below).

TABLE 2

| Key identifier | Text displayed on UI | Initial value | Value range | Applicable models/firmware version | Display requirement | Management type |
|---|---|---|---|---|---|---|
| settings.pattern | Design print | 0 | 0-1 | Model A/all Model B/all Model C/V3.01 or newer | Design license | Edit/reference |
| settings.density | Printing density | 5 | 0-10 | Model A/all Model B/2.01 or newer | — | Edit/reference |
| settings.density | Printing density | 3 | 0-6 | Model B/1.99 or former Model C/all | — | Edit/reference |
| settings.device_sirial | Serial ID | "" | Text | All | — | Reference only |
| settings.copy_cur_page | None (page number of page being copied) | 0 | 0-99999 | All | — | Reference only |
| settings.sleep_time | Sleep time | 0 | 0-14400 | All | | Edit/reference |
| settings.dns_address | DNS server address | "" | Text | All | — | Edit/reference |
| settings.ip_address | IP address | "" | Text | All | — | Edit/reference |
| settings.server_address | Destination | "" | Text | All | — | Edit/ |

TABLE 2-continued

| Key identifier | Text displayed on UI | Initial Value value range | Applicable models/ firmware version | Display requirement | Management type |
|---|---|---|---|---|---|
| ... | server IP address | | | | reference |

The metadata of Table 2 records a plurality of pieces of information applied to the MFPs 102 and 103, and includes the items same as those of the above described Table 1, which are the items of a key identifier, a text displayed on UI, an initial value, a value range, an applicable models/ firmware version, a display requirement, and a management type.

The device setting value DB 420 is data managed by the server 101 and is a list of data which is shared with the MFPs 102 and 103 (hereinafter, referred to as "shared data") (See Table 3 below).

TABLE 3

| Key identifier | Value | Device date/time at change | Server date/time at reflection | Management type |
|---|---|---|---|---|
| settings.density | 0 | 2014/9/9/12:01 | Sept. 9, 2014 12:02 | Edit/ reference |
| settings.sleep_time | 3600 | 2014/9/8/17:35 | Sept. 8, 2014 17:36 | Edit/ reference |
| ... | | | | |

The device setting value DB 420 includes a plurality of pieces of shared data and writes a device date/time at change and a server date/time at reflection of for each piece of the shared data. The device date/time at change is, for example, the date and time when the information to be applied to the MFP 102 is changed, and records a date and time (time) measured by the MFPs 102 and 10. The server date/time at reflection (first time) is, for example, the date and time when the information to be applied to the MFPs 102 and 103 is reflected to the server 101, and is a date and time (time) measured by the server 101. The registered device management DB 430 manages identifiers to identify the MFPs 102 and 103.

The device constructional information DB 440 is device data of the respective MFPs 102 and 103 (see Table 4 below).

TABLE 4

| Property | Value |
|---|---|
| Individual identifier | Individual 1 |
| Model name | Model A |
| Firmware version | 0.01 |
| Installed license | Design license |
| Accessory | Finisher-X |

The device data includes items of an individual identifier, a model name, a firmware version, and an accessory. The individual identifier records an identifier to identify the MFP 102 or 103, and the model name records a model name of the MFP 102 or 103. The firmware version records version information of the firmware of the MFP 102 or 103, and the accessory records an optional device connected to the MFP 102 or 103.

The user information DB 450 is user data related to a user of the MFP 102 or 103 (see Table 5 below).

TABLE 5

| User ID | User name | First name | Last name |
|---|---|---|---|
| 501 | sato | Takashi | Sato |
| 502 | ii | Yoshiko | Ii |
| ... | | | |

The user data records a user ID to identify a user and a user name used when the MFP 102 or 103 performs a user authentification process.

The user setting value DB 460 is setting data of the MFP 102 or 103 to which user's preference is reflected (hereinafter, referred to as "customized setting data") (Table 6 below).

TABLE 6

| User ID | Key identifier | Setting value | Device date/time at change | Server date/time at reflection |
|---|---|---|---|---|
| 501 | preference.print_setting1 | {colormode: "BW", copies: "3"} | Feb. 4, 2014 2:01 | Feb. 4, 2014 2:02 |
| 501 | preference.print_setting2 | {colormode: "CL, quality: "low"} | Feb. 3, 2014 7:35 | Feb. 3, 2014 7:36 |
| 501 | preference.address1 | {destination: "sato@canon.com"} | Aug. 30, 2014 3:01 | Aug. 30, 2014 3:02 |
| 501 | preference.address2 | {destination: "user1@canon.com"} | Jan. 13, 2014 2:16 | Jan. 13, 2014 /2:17 |
| ... | | | | |

The customized setting data records setting values. The setting value records, for example, a destination address specified by the user when transmitting image data from the MFP 102 or 103.

In the server time difference DB 470, when the time measured by the server 101 (hereinafter, referred to as a "server measure time") is changed by a user, a time difference between the server measure time before the change and the server measure time after the change is calculated and written. Further, the server time difference DB 470 records, for example, a time T which is measured when the server 101 is started (hereinafter, referred to as a "start time T"). More specifically, the start time T is firstly written in the server time difference DB 470. Next, when the start time is changed to the time two hours earlier (hereinafter, referred to as a "changed time T1"), the start time T is subtracted from the changed time T1 and "−2 hours" is written as a time difference in the server time difference DB 470. Here, when the server measure time is changed more than once, the time difference is also calculated more than once, and according to the present embodiment, a plurality of the calculated time differences is accumulated and written. For example, there may be a case that, soon after the start time T is changed to the changed time T1, the user notices that there is an error in the changed time T1 itself and changes the changed time T1 to, for example, the time one hour later than the changed time T1 (hereinafter, referred to as a "changed time T2"). In this case, the changed time T1 is subtracted from the changed time T2, the calculated "+1 hour" is added to "−2 hours" written in the server time difference DB 470, and "−1 hour" after the addition is newly written as a time difference in the server time difference DB 470.

Figure 5:
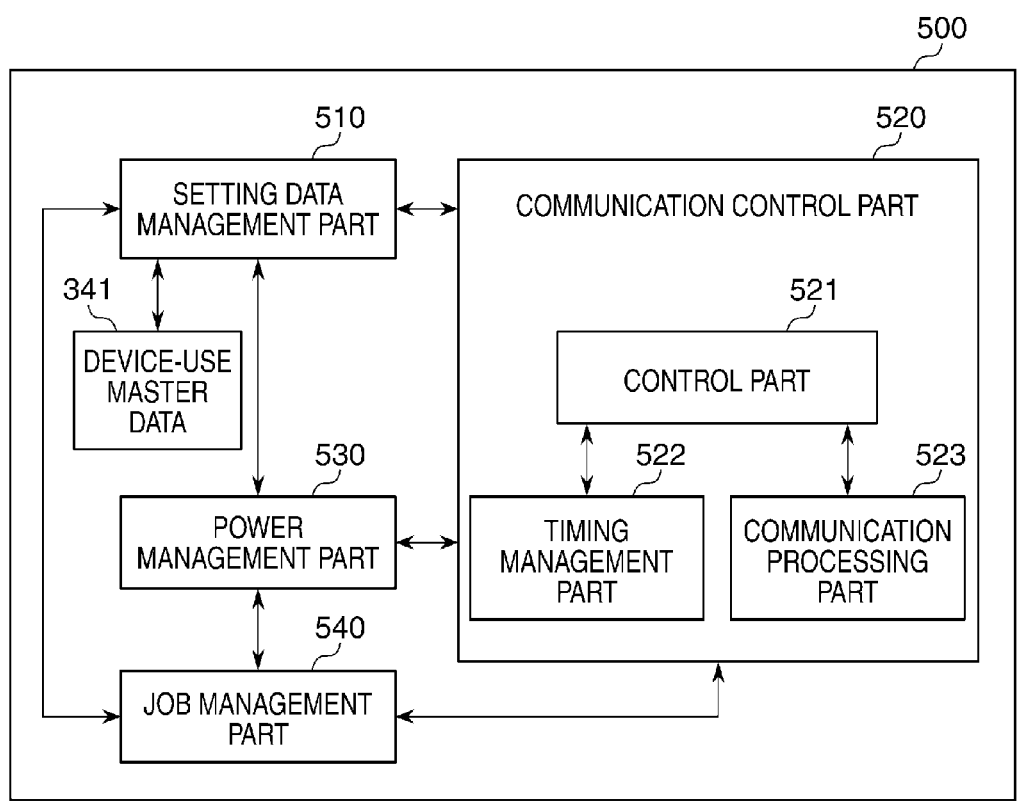
FIG. 5 is a block diagram schematically showing a configuration of a management application realized by a CPU of the MFP appearing in FIG. 3.

FIG. 5 is a block diagram schematically showing a configuration of a management application 500, which is realized by the CPU 302 of the MFP 102 or 103 appearing in FIG. 3.

The management application 500 of FIG. 5 includes a setting data management part 510, a communication control part 520, a power management part 530, and a job management part 540. The communication control part 520 includes a control part 521, a timing management part 522, and a communication processing part 523.

The setting data management part 510 manages the device-use master data 341. The control part 521 controls the communication processing part 523 to receive change information of the master data 400 from the server 101, and asks the setting data management part 510 to reflect the change information to the device-use master data 341. The timing management part 522 manages timing to periodically send, to the server 101, an inquiry on whether or not the change information has been reflected to the master data 400. Further, the timing management part 522 instructs the control part 521 to send, to the server 101, an inquiry on whether or not the change information has been reflected to the master data 400, at a timing of inquiry to the server 101. The control part 521 instructs the communication processing part 523 to communicate with the server 101. The communication processing part 523 executes communication with the server 101, which is connected via the network 104. The power management part 530 manages a power supply status, such as switching on/off of the power of the MFP 102 or 103, whether or not a power saving mode in which power is not supplied to a part of the MFP 102 or 103 is active, or the like. The job management part 540 manages a job execution status of whether a received job is being executed, completed, or not being executed in the MFP 102 or 103.

When the communication control part 520 receives change information from the server 101, the setting data management part 510 reflects the received change information to the device-use master data 341. Further, when the information to be applied to the MFP 102 or 103 included in the device-use master data 341 is changed by a user or the like, the setting data management part 510 asks the server 101 to update the master data 400 with information indicating the changed content.

Further, the timing management part 522 acquires a power supply status from the power management part 530 or acquires a job execution status from the job management part 540. When an acquired power supply status is, for example, a power saving mode, the timing management part 522 decides not to transmit the change information of the device-use master data 341 to the server 101.

Figure 6:
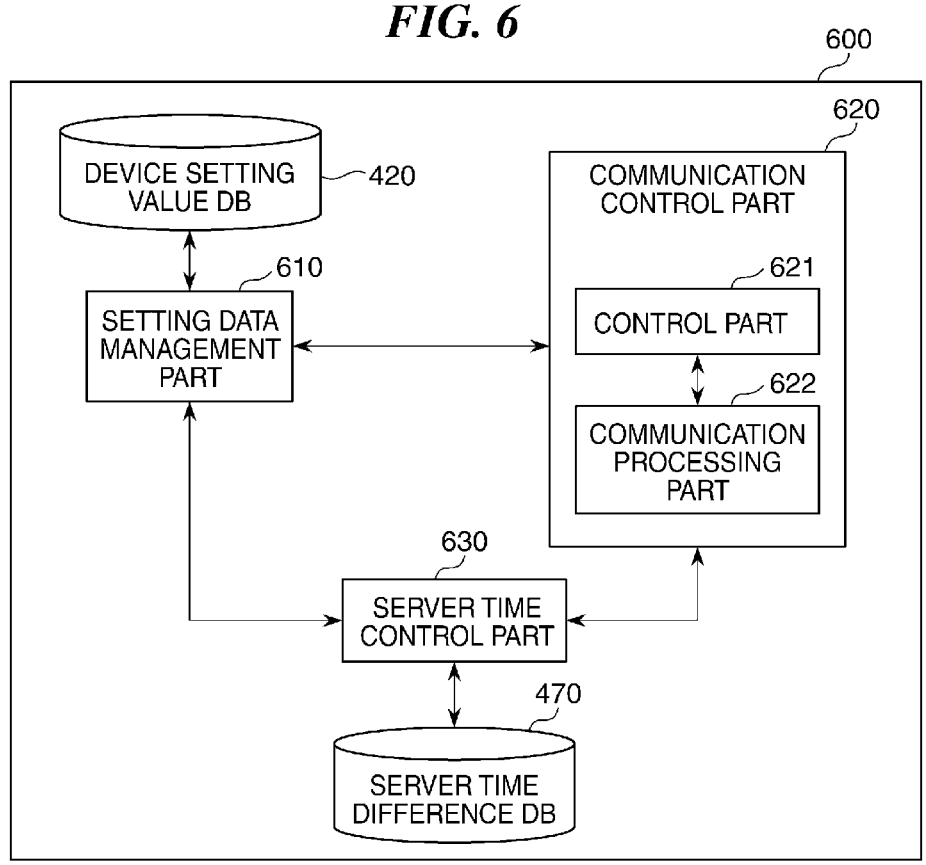
FIG. 6 is a block diagram schematically showing a configuration of a management application realized by a CPU of the server appearing in FIG. 2.

FIG. 6 is a block diagram schematically showing a configuration of a management application 600 realized by the CPU 203 of the server 101 appearing in FIG. 2.

The management application 600 of FIG. 6 includes a setting data management part 610, a communication control part 620, and a server time control part 630. The communication control part 620 includes a control part 621 and a communication processing part 622 (reception unit). The setting data management part 610 manages the device setting value DB 420 of the master data 400. The control part 621 executes a process to share information to be applied to the MFP 102 or 103 with the server 101. The communication processing part 622 executes communication with the MFPs 102 and 103, which are connected via the network 104 to one another. Further, the communication processing part 622 receives change information from the MFP 102 or 103. The control part 621 informs the change information received by the communication processing part 622 to the setting data management part 610. The setting data management part 610 reflects the received change information to the device setting value DB 420. Further, when the communication control part 620 receives a later described request included in the change information, the setting data management part 610 generates response data for the request included in the received change information and transmits the response data to the communication control part 620. The communication processing part 622 receives the response data for the request included in the change information, and the control part 621 controls the communication processing part 622 to transmit the received response data to the MFPs 102 and 103.

When the server measure time is changed by the user, the server time control part 630 writes, to the server time difference DB 470, the time difference calculated based on the server measure time before the change and the server measure time after the change. Further, the server time control part 630 calculates the server measure time before the change (modified first time) based on the server measure time after the change and the time difference written in the server time difference DB 470.

Figure 7:
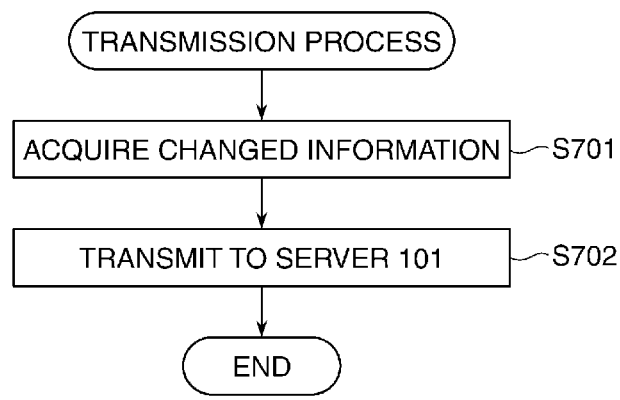
FIG. 7 is a flowchart showing procedures in a transmission process for transmitting change information to the server when information to be written in the device-use master data stored in the HDD of the MFP appearing in FIG. 3 is changed.

FIG. 7 is a flowchart showing procedures in a transmission process for transmitting change information to the server 101 when information written in the device-use master data 341, which is stored in the HDD 305 of the MFPs 102 and 103 of FIG. 3, is changed.

In FIG. 7, firstly, when the information written in the device-use master data 341 is changed for example, the control part 521 of the MFP 102 acquires change information in the device-use master data 341 from the setting data management part 510 (step S701). Next, the communication processing part 523 transmits the acquired change information to the server 101 (step S702) and the CPU 302 terminates the process. In this case, in the change information transmitted from the server 101, a request for requesting, from the MFP 102, an execution of a predetermined process to the server 101 (hereinafter, referred to as a "change-information-attached request") is included.

Figure 8A:
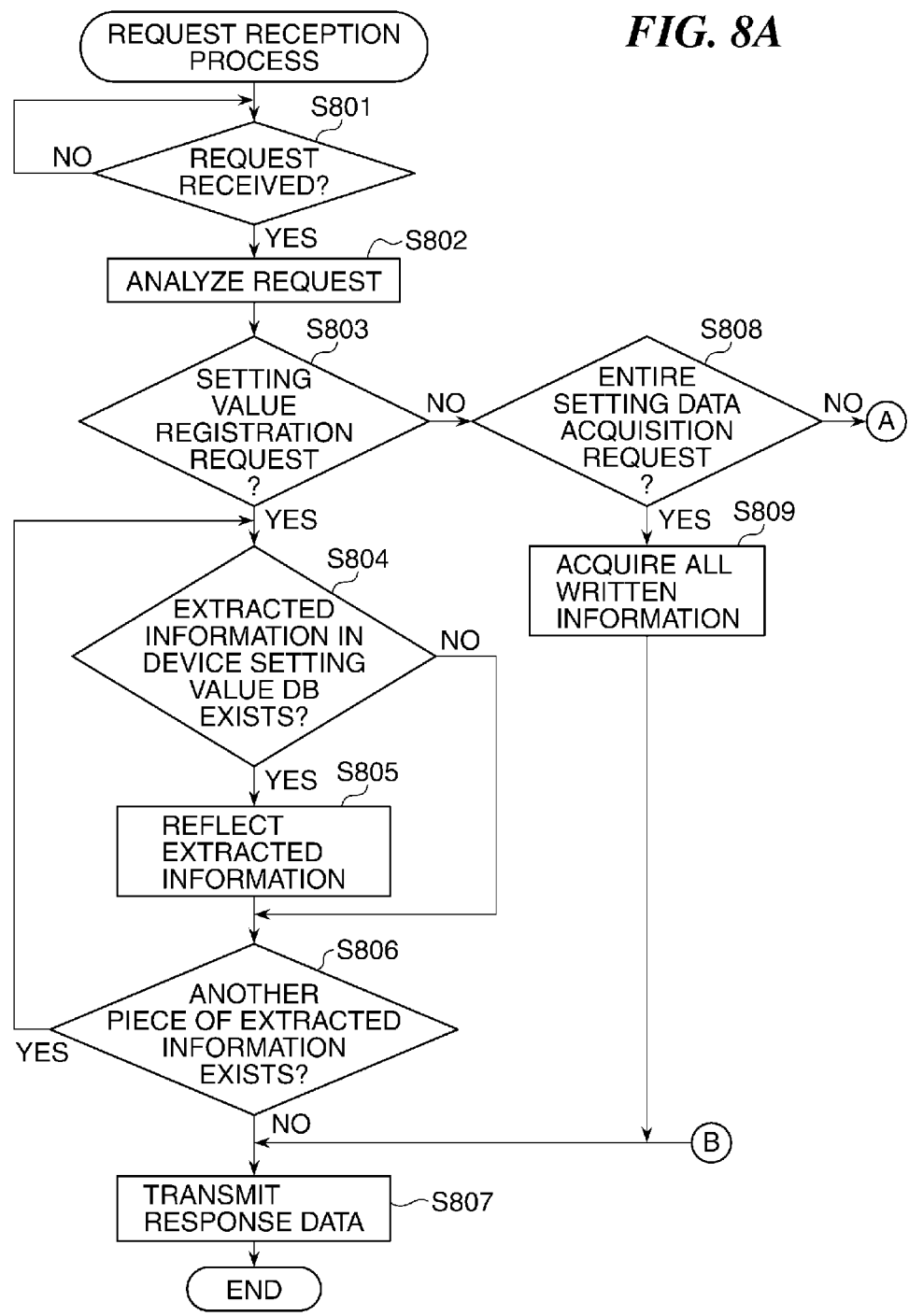

FIGS. 8A and 8B are flowcharts showing procedures in a request reception process executed when the server 101 appearing in FIG. 1 receives a change-information-attached request.

In FIGS. 8A and 8B, firstly, the communication processing part 622 determines whether or not the change-information-attached request is received (step S801). When the communication processing part 622 has not received a change-information-attached request as a result of the determination in step S801, the process returns to step S801. On the other hand, when the change-information-attached request has been received, the communication processing part 622 informs to the control part 621 that the change-information-attached request has been received and analyzes the received change-information-attached request (step S802).

Next, the communication processing part 622 analyzes the change-information-attached request and determines whether or not the change-information-attached request is a "setting value registration request" (step S803). Here, the "setting value registration request" is a request to the server 101 to change the information which is to be applied to MFPs 102 and 103 and written in the device setting value DB 420 or add newly information that is to be applied to the MFPs 102 and 103 to the device setting value DB 420. In the present embodiment, when the change-information-attached request is the "setting value registration request", packet data that includes a header section and a data section is transmitted to the server 101 as a change-information-attached request. In this case, the header section stores "setting value registration request" and the data section stores at least one piece of information to be applied to the MFPs 102 and 103.

When it is determined that the change-information-attached request is the "setting value registration request" in step S803, the control part 621 extracts one piece of information to be applied to the MFPs 102 and 103 from the data section of the change-information-attached request. Next, the setting data management part 610 determines whether or not shared data corresponding to the extracted information to be applied to the MFPs 102 and 103 (hereinafter, referred to as simply "extracted information") is included in the device setting value DB 420 (step S804). When it is determined that the corresponding shared data is included in the device setting value DB 420 in step S804, the setting data management part 610 reflects the extracted information to the device setting value DB 420. That is, the corresponding shared data is updated with the extracted information. In other words, the extracted information is stored in the device setting value DB 420 as change information (step S805). Further, in this case, in the device setting value DB 420, the server measure time is written as a server date/time at reflection at timing that the extracted information is stored as the change information. After that, it is determined whether or not there is another piece of the extracted information in the data section of the change-information-attached request (step S806).

When it is determined that there is another piece of extracted information in the data section of the change-information-attached request in step S806, the process returns to step S804. On the other hand, when it is determined that there is no another piece of extracted information in step S806, the communication processing part 622 transmits, to the server 101, response data that a reception of the change-information-attached request is completed (step S807). After that, the process terminates. The response data to be transmitted to the server 101 in step S807 includes a later described modified time which is calculated based on a time difference written in the server time difference DB 470 and the server measure time at the timing of transmitting the response data.

When it is determined that the change-information-attached request is not a "setting value registration request" in step S803, the communication processing part 622 determines whether or not the change-information-attached request is an "entire setting data acquisition request" (step S808). When it is determined that the change-information-attached request is the "entire setting data acquisition request" in step S808, the setting data management part 610 acquires information which is to be applied to the MFP 102 or MFP 103 and is included in the device setting value DB 420 (hereinafter, referred to as "entire written information") (step S809). After that, the process proceeds to step S807 and the entire written information is transmitted to the MFP 102 or MFP 103 that has transmitted the request to the server 101.

In step S808, when it is determined that the change-information-attached request is not an "entire setting data acquisition request", the communication processing part 622 determines whether or not the change-information-attached request is a "setting value update request" (step S810). In the present embodiment, when the change-information-attached request is the "setting value update request", packet data that includes a header section and a data section is also transmitted to the server 101 as the change-information-attached request. In this case, the header section stores the "setting value update request" and the data section stores at least one piece of information to be applied to the MFP 102 or 103.

In step S810, when it is determined that the change-information-attached request is the "setting value update request", the control part 621 extracts a piece of information to be applied to the MFP 102 or 103 (extracted information) from the data section of the change-information-attached request. After that, the setting data management part 610 is requested to reflect the extracted information to the device setting value DB 420 (step S811). In this case, the setting data management part 610 reflects the extracted information to the device setting value DB 420. In other words, the extracted information is stored in the shared data of the device setting value DB 420 as the change information. Further, in the device setting value DB 420, a server measure time at timing that the extracted information is stored as the change information is stored as a server date/time at reflection.

Next, the control part 621 determines whether or not there is another piece of extracted information (step S812). In step S812, when it is determined that there is another piece of extracted information, the process returns to step S811. On the other hand, when it is determined that there is not another piece of extracted information, the process proceeds to step S807 and the communication processing part 622 transmits response data indicating that the reflection of the extracted information to the device setting value DB 420 is completed.

In step S810, when it is determined that the change-information-attached request is not the "setting value update request", the communication processing part 622 determines whether or not the change-information-attached request is an acquisition request of a difference of setting values (hereinafter, referred to as a "difference acquisition request") (step S813). The "difference acquisition request" is periodically transmitted from the MFP 102 or MFP 103 to the server 101 to inquire whether or not the change information is reflected to the master data 400. The "difference acquisition request" is a request to acquire difference information indicating a difference between a setting value maintained in the MFP 102 or MFP 103 that has sent the request and a setting value that the server 101 stores in the master data 400. The difference information in the present embodiment is information indicating a content of the change (updated content) of the setting value in the master data 400 performed after the MFP 102 or MFP 103 has sent a previous difference acquisition request to the server 101.

The "difference acquisition request" is packet data, similarly to the "setting value registration request" and the "setting value update request". The "difference acquisition request" includes the time that a previous difference acquisition request is transmitted from the MFP 103 or the like (second time), in addition to the time when the MFP 103 or the like transmits a difference acquisition request as the change-information-attached request which is currently received (third time).

In step S813, when it is determined that the change-information-attached request is the "difference acquisition request", the setting data management part 610 acquires, from the device setting value DB 420, the change information stored after the time when the MFP 103 or the like has sent the previous difference acquisition request (step S814). After that, the process proceeds to step S807 and the communication processing part 622 transmits the change information acquired from the device setting value DB 420 as response data.

In step S813, when it is determined that the change-information-attached request is not the "difference acquisition request", the communication processing part 622 determines whether or not the change-information-attached request is a "device information registration request" (step S815). The "device information registration request" includes individual information such as a model name or the like of the MFP 102 or 103 that has transmitted the change-information-attached request. In step S815, when it is determined that the change-information-attached request is the "device information registration request", the control part 621 extracts the individual information of the MFP 102 or MFP 103 from the "device information registration request". Next, the control part 621 controls the setting data management part 610 to register the individual information of the MFP 102 or MFP 103 to the device information DB 440. After that, the setting data management part 610 registers the individual information of the MFP 102 or the like to the device information DB 440 (step S816), the process proceeds to step S807 and the communication processing part 622 transmits response data indicating that the individual information of the MFP 102 or the like is registered.

In step S815, when it is determined that the change-information-attached request is not the "device information registration request", the communication processing part 622 determines whether or not the change-information-attached request is a "device information update request" (step S817). The "device information update request" includes the individual information such as the model name or the like of the MFP 102 or 103 that has transmitted the change-information-attached request. In step S817, when it is determined that the change-information-attached request is the "device information update request", the control part 621 extracts the individual information of the MFP 102 or MFP 103 from the change-information-attached request. Next, the control part 621 controls the setting data management part 610 to reflect the extracted individual information to the device information DB 440. After that, the setting data management part 610 reflects the individual information of the MFP 102 or the like to the device information DB 440 (step S818), the process proceeds to step S807 and the communication processing part 622 transmits response data indicating that the individual information of the MFP 102 or the like is reflected.

In step S817, when it is determined that the change-information-attached request is not the "device information update request", the process proceeds to step S807 and the communication processing part 622 transmits response data indicating that the change-information-attached request has not been received.

Figure 9:
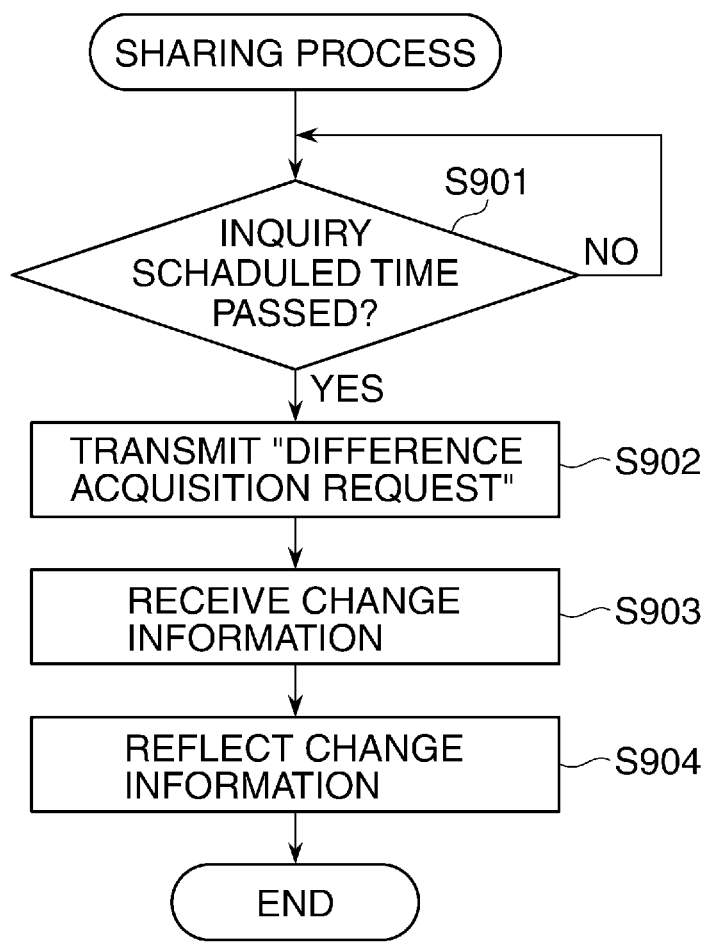
FIG. 9 is a flowchart showing procedures in a sharing process executed when the MFP shares shared data written in a device setting value DB appearing in FIG. 4.

FIG. 9 is a flowchart showing procedures in a sharing process performed when the MFP 103 shares shared data written in the device setting value DB 420 appearing in FIG. 4 with the server 101.

In FIG. 9, firstly, the timing management part 522 of the MFP 103 determines whether or not a predetermined period of time before checking the server 101 if the change information has been reflected to the master data 400 (hereinafter, referred to as a "inquiry scheduled time") has passed (step S901). In step S901, when it is determined that the inquiry scheduled time has not passed, the process returns to step S901. On the other hand, when the inquiry scheduled time has passed, the control part 521 instructs the communication processing part 523 to transmit the "difference acquisition request" to the server 101. The communication processing part 523 then transmits the "difference acquisition request" to the server 101 (step S902). As described above, the "difference acquisition request" includes the time when the previous difference acquisition request is transmitted (hereinafter, referred to as a "previous request time") in addition to the time when the current difference acquisition request is transmitted (hereinafter, referred to as a "current request time").

Next, the communication processing part 523 receives, from the server 101, the change information stored after the previous request time (step S903) and transmits the received change information to the control part 521 (step S903). The control part 521 transmits the change information to the setting data management part 510, and the setting data management part 510 reflects the received change information to the device-use master data 341 (step S904). After that, the process terminates.

Figure 10:
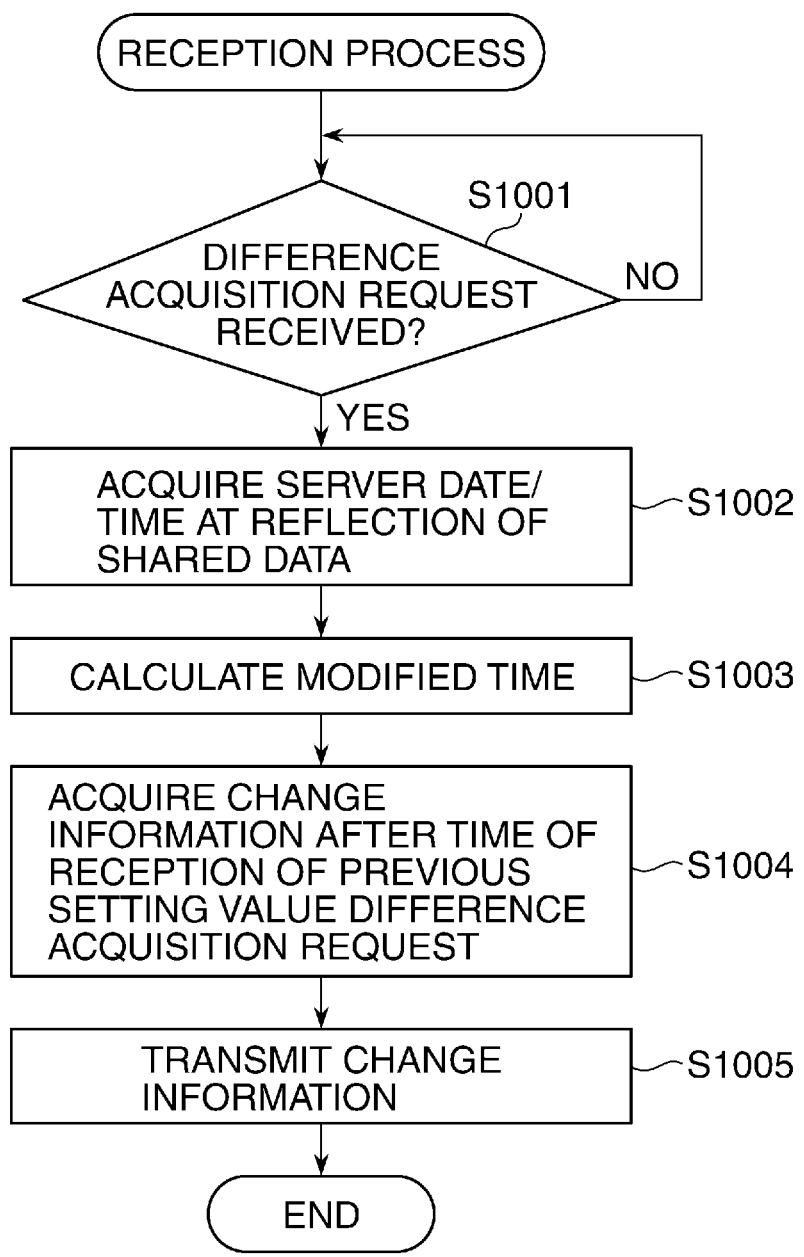
FIG. 10 is a flowchart showing procedures in a reception process that represents an operation of the server when receiving a difference acquisition request having been transmitted from the MFP in step S903 of FIG. 9.

FIG. 10 is a flowchart showing procedures in a reception process that represents an operation of the server 101 when receiving the difference acquisition request transmitted from the MFP 103 or the like in step S903 of FIG. 9.

In FIG. 10, firstly, the communication processing part 622 determines whether or not the difference acquisition request has been received (step S1001). When the difference acquisition request has not been received, the process returns to step S1001. On the other hand, when the difference acquisition request has been received, the communication processing part 622 informs the control part 621 that the difference acquisition request has been received and acquires a server date/time at reflection of each piece of shared data of the device setting value DB 420 (step S1002). Next, the server time control part 630 acquires a time difference by referring to the server time difference DB 470 and the CPU 203 calculates a modified time by adding the time difference to the respective acquired server date/time at reflection (step S1003). In this case, when the server measure time is changed by the user more than once and an accumulated time in which a plurality of time differences is accumulated (hereinafter, referred to as an "accumulated time difference") is written in the server time difference DB 470, the modified time is calculated by adding the accumulated time difference to the time of the reception.

Next, the control part 621 requests the setting data management part 610 to acquire, from the device setting value DB 420, the change information to be transmitted to the MFP 103. In this case, the setting data management part 610 selects the modified time which is included in the difference acquisition request and is a time (exists) between the previous request time and the current request time. After that, the setting data management part 610 acquires, from the device setting value DB 420, shared data corresponding to the selected modified time as the change information stored after the previous request time (step S1004). Next, the control part 621 receives the change information, which the setting data management part 610 acquired, and instructs the communication processing part 622 to transmit the change information to the MFP 103, and the communication processing part 622 then transmits the change information to the MFP 103 (step S1005). After that, the process terminates.

According to FIG. 10, when the difference acquisition request is received, the server date/time at reflection of each piece of the shared data is acquired (step S1002) and the modified time is calculated by adding the time difference to the respective server date/time at reflection (step S1003). Further, the shared data of the modified time that exists between the previous request time and the current request time included in the difference acquisition request is acquired as the change information (step S1004), and the acquired change information is transmitted to the MFP 103 (step S1005). Accordingly, even when the server measure time is changed and the server date/time at reflection of each piece of shared data is changed, the shared data of the modified time that exists between the previous request time and the current request time can be transmitted to the MFP 103 as the change information. As a result, even when the server measure time is changed, all of the change information of the MFP 102 can be shared with the MFP 103. In other words, the MFPs 102 and 103, which are the plurality of information processing apparatuses, are surely synchronized.

In the process of FIG. 10, when the server measure time is changed more than once and the accumulated time difference is written in the server time difference DB 470, the accumulated time difference is added to the respective server date/time at reflection. In other words, changes of a plurality of server measure times are added to the modified time. Accordingly, even when the server measure time is changed more than once, the shared data of the modified time that exists between the previous request time and the current request time is surely transmitted to the MFP 103 as the change information.

Next, a second embodiment of the present invention will be described.

In the second embodiment of the present invention, its structure and effect are basically same as those of the above described first embodiment, and the difference from the first embodiment is that the MFPs 102 or 103 has an application that executes a function of the server 101 (hereinafter, referred to as a "server application"). Hereinafter, the description of the structure and effect that are duplicated with those of the first embodiment will not be repeated and different structure and effect will be described. Here, according to the present embodiment, in the server application, each component of the server 101 is realized by a module or the like.

Figure 11:
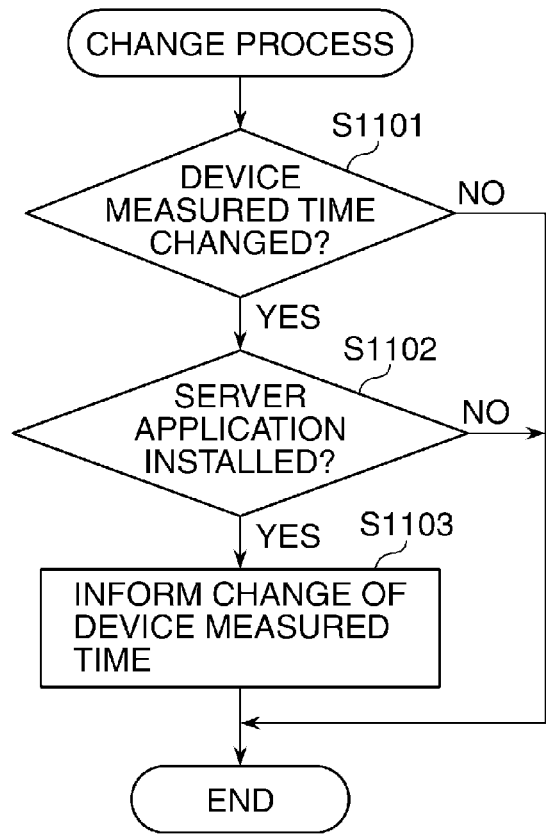
FIG. 11 is a flowchart showing procedures in a change process executed when the time measured by an MFP, as information applied to the MFP according to a second embodiment of the present invention is changed.

FIG. 11 is a flowchart showing procedures in a change process in a case that times measured by the MFP 102 or 103 as information to be applied to the MFPs 102 and 103 according to the second embodiment of the present invention are changed.

In FIG. 11, firstly, the CPU 302 determines whether or not the time measured by the MFP 102 or 103 (hereinafter, referred to as a "device measured time") has been changed (step S1101). In step S1101, when it is determined that the device measured time has not been changed, the CPU 302 terminates the process. On the other hand, when it is determined that the device measured time has been changed, the CPU 302 determines whether or not the MFP 102 or 103 has a server application (step S1102). In step S1102, when it is determined that the MFP 102 or 103 does not have the server application, the CPU 302 terminates the process. On the other hand, when it is determined that the MFP 102 or 103 has the server application, the CPU 302 informs the server application being activated on the MFP 102 or 103 that the device measured time has been changed (step S1103) and terminates the process.

Figure 12:
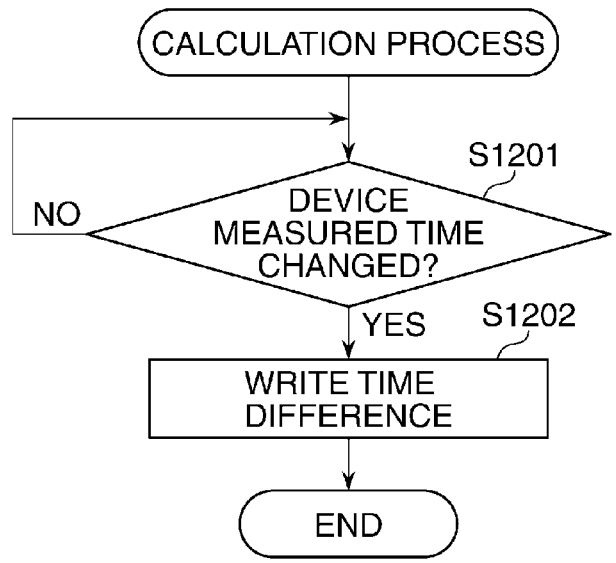
FIG. 12 is a flowchart showing procedures in a calculation process for calculating a time difference based on a device measured time after a change and a device measured time before the change in step S1102 of FIG. 11.

FIG. 12 is a flowchart showing procedures in a calculation process for calculating a time difference based on the device measured time after the change and the device measured time before the change in step S1102 of FIG. 11.

In FIG. 12, firstly, the server application determines whether or not a notification of the changed device measured time has been received (step S1201). In step S1201, when it is determined that the notification of the changed device measured time has not been received, the process returns to step S1201. On the other hand, when it is determined that the notification of the changed device measured time has been received, the server application calculates a time difference between the device measured time before the change and the device measured time after the change. Next, the server application writes the calculated time difference in the server time difference DB 470 (step S1202) and terminates the process.

Figure 13:
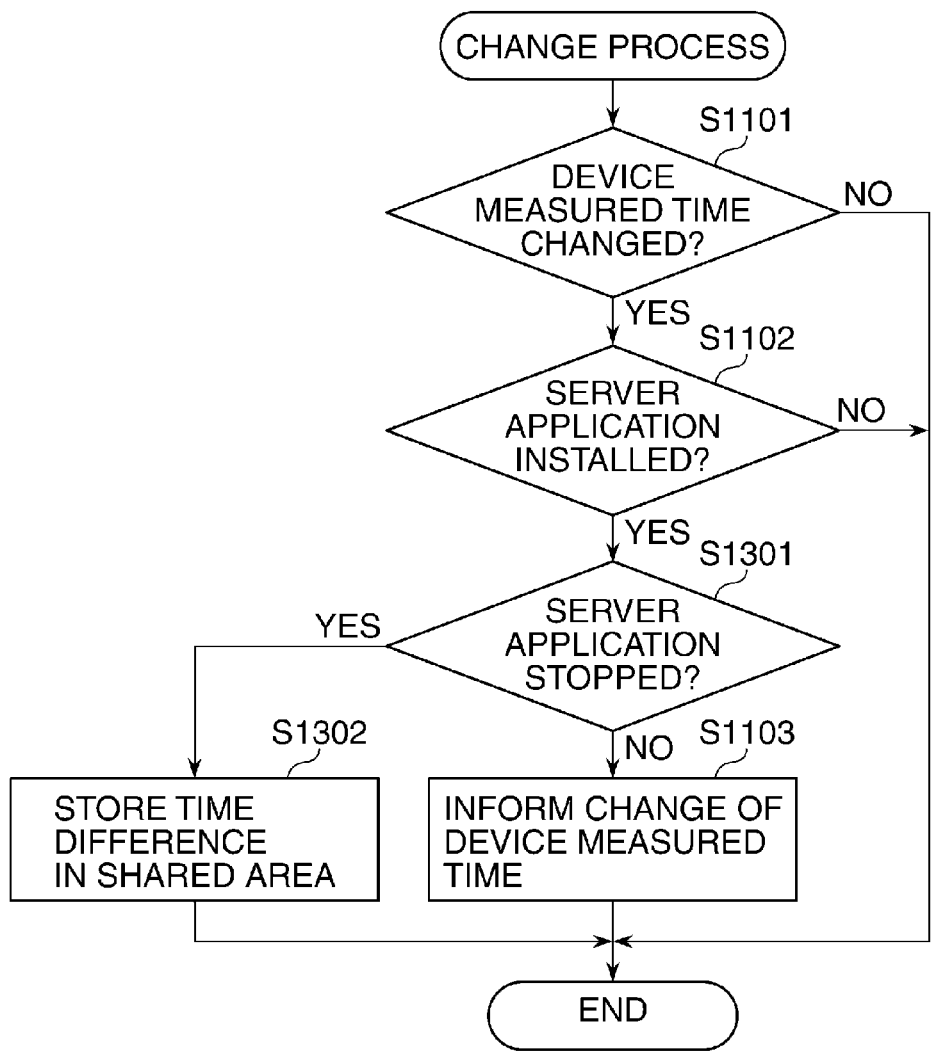
FIG. 13 is a flowchart showing procedures in a variation of the change process of FIG. 11.

FIG. 13 is a flowchart showing procedures in a variation of the change process of FIG. 11. The process in FIG. 13 has a difference, from the process in FIG. 11, that it assumes a case that the server application has been stopped. The process in steps S1101 to S1103 of FIG. 13 is the same as the process in steps S1101 to S1103 of FIG. 11. In the following, only a part different from the process in FIG. 11 will be described.

In FIG. 13, when the MFP 102 or 103 has a server application (YES in step S1102), it is determined whether or not the server application has been stopped (step S1301). In step S1301, when it is determined that the server application has not been stopped, the process proceeds to step S1103. On the other hand, in a case that the server application has been stopped, when the device measured time is changed, the CPU 302 calculates a time difference between the device measured time before the change and the device measured time after the change. After that, the CPU 302 stores the calculated time difference in a part of an area in the HDD 305 that is accessible by the server application and both of the MFPs 102 and 103 (hereinafter, referred to as a "shared area") (step S1302) and terminates the process.

Figure 14:
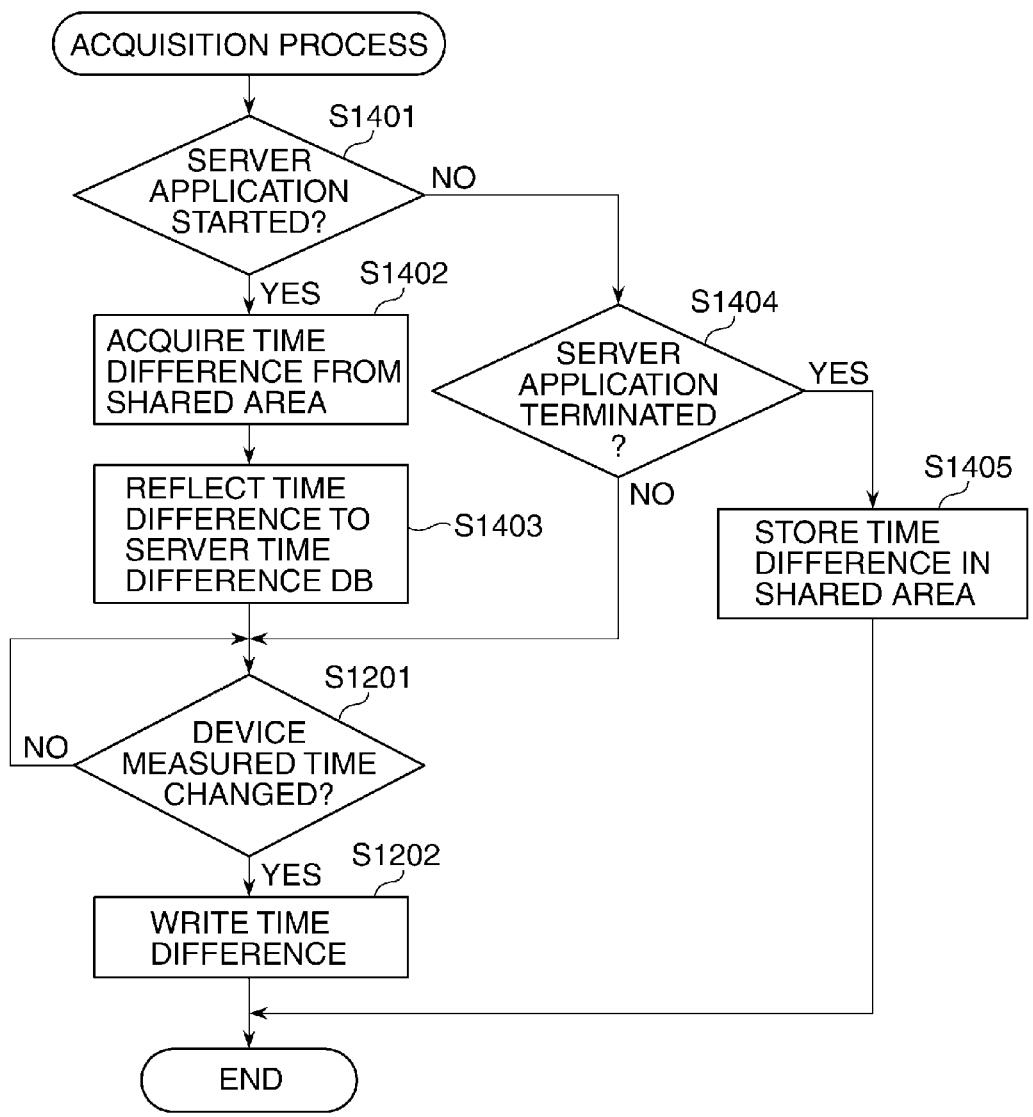
FIG. 14 is a flowchart showing procedures in an acquisition process for acquiring a time difference stored in a shared area in step S1302 of FIG. 13.

FIG. 14 is a flowchart showing procedures in an acquisition process for acquiring the time difference stored in the shared area in step S1302 of FIG. 13. The process in FIG. 14 is executed after the process of FIG. 13 including step 1302 is finished. The process in steps S1201 to S1202 of FIG. 14 is the same as the process in steps S1201 to S1202 in FIG. 12 and. In the following, only the part different from the process of FIG. 12 will be described.

In FIG. 14, firstly, it is determined whether or not the server application has been started (step S1401). In step S1401, when it is determined that the server application has been started, the time difference stored in the shared area is acquired (step S1402) and the acquired time difference is reflected to the server time difference DB 470 (step S1403). After that, the process proceeds to step S1201. In step S1401, when it is determined that the server application has not been started, it is determined whether or not the server application is terminated (step S1404). In step S1404, when it is determined that the server application is not terminated, the process proceeds to step S1201, and when the server application is terminated, the time difference is stored in the shared area (step S1405). After that, the process terminates.

According to the process in FIG. 13, when the server application has been stopped, the time difference between the device measured time before the change and the device measured time after the change is stored in the shared area (step S1302). Accordingly, even when the device measured time is changed while the server application has been stopped, the server application can use the time difference after resume thereof and the modified time can be surely calculated based on the server date/time at reflection of each piece of shared data.

The present invention may be realized by a process of providing a program that realizes one or more function of the above described embodiments to a system or an apparatus via a network or a storage medium and of executing the program by one or more processors in a computer of the system or the apparatus. Further, the present invention can be realized by a circuit that implements one or more function (for example, an ASIC).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-165852, filed Aug. 25, 2015 which is hereby incorporated by reference wherein in its entirety.

What is claimed is:

1. A server configured to communicate with a plurality of information processing apparatuses and measures time, the server including at least one processor and at least one memory coupled to the at least one processor which act as:
   a storage control unit configured to store, in a storage unit, information changed in one of the information processing apparatuses;
   a first writing unit configured to write a first time that the server measures in response to the storing of the changed information;
   a reception unit configured to receive, from another of the information processing apparatuses, an inquiry on whether or not the storage control unit has stored the changed information;
   a transmission unit configured to transmit information indicating a content of the changed information to the other of the information processing apparatuses in a case where the written first time is the time between a second time when the reception unit received a previous inquiry and a third time when the reception unit received the current inquiry;
   a second writing unit configured to calculate and write, in response to the time that the server measures being changed by a user, a time difference between the time before the change and the time after the change; and
   an acquisition unit configured to acquire a modified first time by applying the written time difference to the written first time when the time that the server measures is changed by the user after the first time has been written,
   wherein, in a case where the modified first time is a time between the time when the previous inquiry was received and the time when the current inquiry is received, the transmission unit transmits the information indicating the content of the changed information to the other of the information processing apparatuses.

2. The server according to claim 1, wherein
   when the time that the server measures is changed by the user more than once, the second writing unit accumulates and writes time differences between the time before the change and the time after the change for the respective changes, and
   when the written first time is changed, the acquisition unit acquires the modified first time by applying the accumulated and written time differences to the changed first time.

3. An information processing system that includes a server that measures time and a plurality of information processing apparatuses, the system including at least one processor and at least one memory coupled to the at least one processor which act as:
   a storage control unit configured to store, in a storage unit, information changed in one of the information processing apparatuses;
   a first writing unit configured to write a first time that the server measures in response to the storing of the changed information;

a reception unit configured to receive, from another of the information processing apparatuses, an inquiry on whether or not the storage control unit has stored the changed information;

a transmission unit configured to transmit information indicating a content of the changed information to the other of the information processing apparatuses in a case where the written first time is the time between a second time when the reception unit received a previous inquiry and a third time when the reception unit received the current inquiry;

a second writing unit configured to calculate and write, in response to the time that the server measures being changed by a user, a time difference between the time before the change and the time after the change; and an acquisition unit configured to acquire a modified first time by applying the written time difference to the written first time when the time that the server measures is changed by the user after the first time has been written, wherein, in a case where the modified first time is a time between the time when the previous inquiry was received and the time when the current inquiry is received, the transmission unit transmits the information indicating the content of the changed information to the other of the information processing apparatuses.

4. An information processing apparatus installed with a server that measures time, the server including at least one processor and at least one memory coupled to the at least one processor which act as:

a storage control unit configured to store, in a storage unit, information changed in the information processing apparatus;

a first writing unit configured to write a first time that the server measures in response to the storing of the changed information;

a reception unit configured to receive, from another information processing apparatus, an inquiry on whether or not the storage control unit has stored the changed information;

a transmission unit configured to transmit information indicating a content of the changed information to the other information processing apparatus in a case where the written first time is the time between a second time when the reception unit received a previous inquiry and a third time when the reception unit received the current inquiry;

a second writing unit configured to calculate and write, in response to the time that the server measures being changed by a user, a time difference between the time before the change and the time after the change; and an acquisition unit configured to acquire a modified first time by applying the written time difference to the written first time when the time that the server measures is changed by the user after the first time has been written, wherein, in a case where the modified first time is a time between the time when the previous inquiry was received and the time when the current inquiry is received, the transmission unit transmits the information indicating the content of the changed information to the other information processing apparatus.

5. The information processing apparatus according to claim 4, further comprising a storage section configured to be accessible by the server and the information processing apparatus, wherein, when the time is changed by the user and the time difference is acquired while the server is stopped, the storage section stores the acquired time difference.

6. A control method for a server that is configured to be connected to a plurality of information processing apparatuses and measures time, the method comprising:

a step of storing information changed in one of the information processing apparatuses;

a step of writing a first time that the server measures in response to the storing of the changed information;

a step of receiving, from another of the information processing apparatuses, an inquiry on whether or not the changed information has been stored;

a step of transmitting information indicating a content of the changed information to the other of the information processing apparatuses in a case where the written first time is the time between a second time when a previous inquiry was received and a third time the current inquiry is received;

a step of calculating and writing, in response to the time that the server measures being changed by a user, a time difference between the time before the change and the time after the change;

a step of acquiring, when the time that the server measures is changed by the user after the first time has been written, a modified first time by applying the written time difference to the written first time; and a step of transmitting information indicating the content of the changed information to the other of the information processing apparatuses in a case where the modified first time is a time between the time when the previous inquiry was received and the time when the current inquiry is received.

7. A control method for an information processing system that includes a server that measures time and a plurality of information processing apparatuses, the method comprising:

a step of storing information changed in one of the information processing apparatuses;

a step of writing a first time that the server measures in response to the storing of the changed information;

a step of receiving, from another of the information processing apparatuses, an inquiry on whether or not the changed information has been stored;

a step of transmitting information indicating a content of the changed information to the other of the information processing apparatuses in a case where the written first time is the time between a second time when a previous inquiry was received and a third time when the current inquiry is received;

a step of calculating and writing, in response to the time that the server measures being changed by a user, a time difference between the time before the change and the time after the change;

a step of acquiring, when the time that the server measures is changed by the user after the first time has been written, a modified first time by applying the written time difference to the written first time; and a step of transmitting information indicating the content of the changed information to the other of the information processing apparatuses in a case where the modified first time is a time between the time when the previous inquiry was received and the time when the current inquiry is received.

8. A control method for an information processing apparatus configured to be installed with a server that measures time, the method comprising:

a step of storing information changed in the information processing apparatus;

a step of writing a first time that the server measures in response to the storing of the changed information;

a step of receiving, from another information processing apparatus, an inquiry on whether or not the changed information has been stored;

a step of transmitting information indicating a content of the changed information to the other information processing apparatus in a case where the written first time is the time between a second time when a previous inquiry was received and a third time when the current inquiry is received;

a step of calculating and writing, in response to the time that the server measures being changed by a user, a time difference between the time before the change and the time after the change;

a step of acquiring, when the time that the server measures is changed by the user after the first time has been written, a modified first time by applying the written time difference to the written first time; and a step of transmitting information indicating the content of the changed information to the other information processing apparatus in a case where the modified first time is a time between the time when the previous inquiry was received and the time when the current inquiry is received.

9. A non-transitory computer-readable storage medium having stored therein a program for causing a computer to implement a control method for a server that is configured to be connected to a plurality of information processing apparatuses and measures time, the control method for the server comprising:

a step of storing information changed in one of the information processing apparatuses;

a step of writing a first time that the server measures in response to the storing of the changed information;

a step of receiving, from another of the information processing apparatuses, an inquiry on whether or not the changed information has been stored;

a step of transmitting information indicating a content of the changed information to the other of the information processing apparatuses in a case where the written first time is the time between a second time when a previous inquiry was received and a third time when the current inquiry is received;

a step of calculating and writing, in response to the time that the server measures being changed by a user, a time difference between the time before the change and the time after the change;

a step of acquiring, when the time that the server measures is changed by the user after the first time has been written, a modified first time by applying the written time difference to the written first time; and a step of transmitting information indicating the content of the changed information to the other of the information processing apparatuses in a case where the modified first time is a time between the time when the previous inquiry was received and the time when the current inquiry is received.

10. A non-transitory computer-readable storage medium having stored therein a program for causing a computer to implement a control method for an information processing system having a server that measures time and a plurality of information processing apparatuses, the control method for the information processing system comprising:

a step of storing information changed in one of the information processing apparatuses;

a step of writing a first time that the server measures in response to the storing of the changed information;

a step of receiving, from another of the information processing apparatuses, an inquiry on whether or not the changed information has been stored;

a step of transmitting information indicating a content of the changed information to the other of the information processing apparatuses in a case where the written first time is the time between a second time when a previous inquiry was received and a third time when the current inquiry is received;

a step of calculating and writing, in response to the time that the server measures being changed by a user, a time difference between the time before the change and the time after the change;

a step of acquiring, when the time that the server measures is changed by the user after the first time has been written, a modified first time by applying the written time difference to the written first time; and a step of transmitting information indicating the content of the changed information to the other of the information processing apparatuses in a case where the modified first time is a time between the time when the previous inquiry was received and the time when the current inquiry is received.

11. A non-transitory computer-readable storage medium having stored therein a program for causing a computer to implement a control method for an information processing apparatus configured to be installed with a server that measures time, the control method for the information processing apparatus comprising:

a step of storing information changed in the information processing apparatus;

a step of writing a first time that the server measures in response to the storing of the changed information;

a step of receiving, from another information processing apparatus, an inquiry on whether or not the changed information has been stored;

a step of transmitting information indicating a content of the changed information to the other information processing apparatus in a case where the written first time is the time between a second time when a previous inquiry was received and a third time when the current inquiry is received;

a step of calculating and writing, in response to the time that the server measures being changed by a user, a time difference between the time before the change and the time after the change;

a step of acquiring, when the time that the server measures is changed by the user after the first time has been written, a modified first time by applying the written time difference to the written first time; and a step of transmitting information indicating the content of the changed information to the other information processing apparatus in a case where the modified first time is a time between the time when the previous inquiry was received and the time when the current inquiry is received.

\* \* \* \* \*